US 8,700,630 B2

(12) United States Patent
Wexler et al.

(10) Patent No.: US 8,700,630 B2
(45) Date of Patent: Apr. 15, 2014

(54) ALGORITHMICALLY GENERATED TOPIC PAGES WITH INTERACTIVE ADVERTISEMENTS

(75) Inventors: Mike Wexler, Santa Clara, CA (US); Scott Roy, Palo Alto, CA (US); Ingrid Lestiyo, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 390 days.

(21) Appl. No.: 12/391,968

(22) Filed: Feb. 24, 2009

(65) Prior Publication Data
US 2010/0228712 A1 Sep. 9, 2010

(51) Int. Cl.
  *G06F 17/30* (2006.01)
  *G06F 7/00* (2006.01)
(52) U.S. Cl.
  USPC ............... 707/738; 707/752; 707/756
(58) Field of Classification Search
  USPC ........................................ 707/738
  See application file for complete search history.

(56) References Cited

U.S. PATENT DOCUMENTS

| | | | | |
|---|---|---|---|---|
| 6,038,560 A * | 3/2000 | Wical | .................... | 707/999.005 |
| 6,282,532 B1 * | 8/2001 | Sandell | ................... | 707/738 |
| 6,411,924 B1 * | 6/2002 | de Hita et al. | ................ | 704/9 |
| 6,473,752 B1 * | 10/2002 | Fleming, III | ................ | 707/708 |
| 7,089,226 B1 | 8/2006 | Dumais et al. | ............... | 707/3 |
| 7,168,051 B2 * | 1/2007 | Robinson et al. | ............ | 715/848 |
| 7,340,466 B2 * | 3/2008 | Odom et al. | ................ | 704/9 |
| 7,363,302 B2 * | 4/2008 | Lester | ................ | 725/42 |
| 7,424,478 B2 | 9/2008 | Licon et al. | ................ | 1/1 |
| 7,464,003 B2 * | 12/2008 | Pomplun | ................ | 702/187 |
| 7,716,161 B2 * | 5/2010 | Dean et al. | ................ | 705/14.49 |
| 7,836,040 B2 * | 11/2010 | Lee | ................ | 707/708 |
| 8,126,930 B2 * | 2/2012 | Shukla et al. | ................ | 707/802 |
| 2001/0034661 A1 * | 10/2001 | Ferreira | ................ | 705/26 |
| 2002/0113820 A1 * | 8/2002 | Robinson et al. | ............ | 345/764 |
| 2002/0120507 A1 * | 8/2002 | Chanos et al. | ................ | 705/14 |
| 2002/0156917 A1 | 10/2002 | Nye | ................ | 709/238 |
| 2003/0036848 A1 * | 2/2003 | Sheha et al. | ................ | 701/209 |
| 2004/0172381 A1 * | 9/2004 | Licon et al. | ................ | 707/1 |
| 2004/0205555 A1 | 10/2004 | Hind et al. | ................ | 715/513 |

(Continued)

OTHER PUBLICATIONS

PCT International Search Report—PCT/US2009/002241, Nov. 30, 2009, 3 pages.

(Continued)

*Primary Examiner* — James Trujillo
*Assistant Examiner* — Pavan Mamillapalli
(74) *Attorney, Agent, or Firm* — Martine Penilla Group, LLP

(57) ABSTRACT

A method and system for generating a topic page for a search query on a search webpage includes receiving a query at the search webpage on a client. The query is transmitted from the search webpage on the client to a search engine on a server. A topic page generator available to the search engine analyzes the query to identify a plurality of dimensions. One or more content modules, including at least one interactive advertising module, that match one or more of the dimensions are selected from a plurality of sources based on a weight associated with each of the content modules. The weight defines the ranking of a content module. The content modules for the plurality of dimensions are glued together and presented on the topic page in the order of the corresponding weight of the content modules. The order of presentation identifies the relevancy of the content modules to the query. The presented topic page provides the most relevant content modules for the query, and for a user located in a specific geo location.

20 Claims, 10 Drawing Sheets

(56) References Cited

U.S. PATENT DOCUMENTS

| | | | |
|---|---|---|---|
| 2004/0267806 A1* | 12/2004 | Lester | 707/103 R |
| 2005/0027705 A1 | 2/2005 | Sadri et al. | 705/5 |
| 2005/0091111 A1* | 4/2005 | Green et al. | 705/14 |
| 2005/0216447 A1* | 9/2005 | Talib et al. | 707/3 |
| 2005/0270311 A1 | 12/2005 | Rasmussen et al. | 345/677 |
| 2006/0004732 A1* | 1/2006 | Odom | 707/3 |
| 2006/0005137 A1 | 1/2006 | Jolley | 715/742 |
| 2006/0095331 A1* | 5/2006 | O'Malley et al. | 705/22 |
| 2007/0038567 A1* | 2/2007 | Allaire et al. | 705/50 |
| 2007/0136689 A1* | 6/2007 | Richardson-Bunbury et al. | 715/816 |
| 2007/0162424 A1 | 7/2007 | Jeh et al. | 707/2 |
| 2007/0185768 A1 | 8/2007 | Vengroff et al. | 705/14 |
| 2007/0226198 A1 | 9/2007 | Kapur | 707/3 |
| 2007/0250492 A1 | 10/2007 | Angel et al. | 707/14 |
| 2008/0046312 A1* | 2/2008 | Shany et al. | 705/14 |
| 2008/0115082 A1* | 5/2008 | Simmons et al. | 715/804 |
| 2008/0215416 A1* | 9/2008 | Ismalon | 705/10 |
| 2009/0138356 A1* | 5/2009 | Pomplun | 705/14 |
| 2009/0164949 A1* | 6/2009 | Henkin et al. | 715/862 |
| 2009/0240674 A1* | 9/2009 | Wilde et al. | 707/4 |
| 2009/0281989 A1* | 11/2009 | Shukla et al. | 707/3 |
| 2010/0017289 A1* | 1/2010 | Sah et al. | 705/14.49 |
| 2010/0088179 A1* | 4/2010 | Desai et al. | 705/14.49 |
| 2010/0138452 A1 | 6/2010 | Henkin et al. | |

OTHER PUBLICATIONS

Long, NPL "Google Hacking for Penetration Testers", Jul. 2004, Syngress.

* cited by examiner

Figure 2E

ALGORITHMICALLY GENERATED TOPIC PAGES WITH INTERACTIVE ADVERTISEMENTS

CROSS REFERENCE TO RELATED APPLICATION

This application is related to U.S. patent application Ser. No. 12/116,195 filed May 6, 2008, entitled "Algorithmically Generated Topic Pages," assigned to the assignee, which is incorporated herein by reference in its entirety for all purposes.

BACKGROUND

1. Field of the Invention

The present invention relates to internet searching, and more particularly, to generating topic pages with interactive advertisements through an algorithm that assembles content in response to analyzing a search query.

2. Description of the Related Art

With the proliferation of information available on the internet, the internet has become an effective search tool. A search engine equipped with a search tool receives a query with one or more keywords, uses the keyword(s) to search a repository of information available to the search engine and returns a plurality of search results that match the search query. The search results are returned in the matching order of the keyword(s) with the highest amount of match being at the top. To narrow the search results, additional keywords may be used. Additional related pages, including online advertisements, are generated based on the matched keywords.

Traditionally, advertisements generated in connection with search engine results pages are static. For example, generated advertisements may include a module including an advertisement for a product, service, or company, or a list of sponsored links.

SUMMARY

Embodiments of the present invention provide methods and computer implemented systems that enable generating a topic page (e.g., for search queries on a search webpage). The topic page may include one or more interactive advertising modules permitting a user to interact with an interactive advertisement to purchase a service or product related to a search query, or otherwise obtain more information regarding a product or service related to a search query. Some embodiments may employ a glue algorithm that identifies and brings together content modules and links to related pages for a plurality of dimensions for a specific geographic, or "geo," location associated with the query. A query for a search may be received at the search webpage on a client and transmitted to a search engine on a server. The query may be analyzed at the search engine, to identify a plurality of dimensions. These dimensions may identify categories that define a topic, one or more intents, and a geo location for the query. The search engine may use the dimensions for the query to search a plurality of sources and to identify one or more content modules that match one or more of the dimensions, wherein the one or more content modules may include an interactive advertisement. The content modules may be selected based on a weight associated with each content module. The weight of each content module may define a ranking of the content module and may be provided as part of metadata associated with the content module. The selected content modules may be presented in a topic page such that the order of the content modules on the topic page indicates a ranking-based relevancy of the content modules to the query. The topic page generated with the content modules may provide search results, including interactive advertisements, that are relevant to the particular geo location associated with the query, thereby eliminating unnecessary contents from being included in the topic page. Further, the weighting of the content modules may ensure that the most relevant content modules are returned in response to the query.

Accordingly, the embodiments of the invention provide a tool to customize a search result webpage to reflect the true purpose of the query based on topic, intent and geo locations for the query, and to automatically tag content pages accordingly as they are available on the internet so that mining of information may be efficiently managed. Additionally, embodiments of the invention provide a tool to assist a user in accomplishing a desired task associated with a query. For example, the interactive advertising module of the topic page may have one or more portions pre-populated based on topic, intent and geo locations for the query. In addition, pre-populated portions may be based on dimensions associated with a user submitting the query.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 2E illustrates an example topic page with relevant content modules associated with yet another topic at different geo locations, in accordance with embodiments of the present disclosure.

DETAILED DESCRIPTION

Broadly speaking, the embodiments of the present invention may provide methods and computer implemented systems that enable generating a topic page, including interactive advertising, in response to a search query on a search webpage. A query may be received at the search webpage from a user interface on a client. The query may be forwarded to a search engine on a server. The query may be received at the server and analyzed at the search engine by a topic page generator. The topic page generator may be in the form of a code running on a server, and may not be integrally coupled to the search engine logic. A plurality of dimensions may be identified for the query. One or more content modules from a plurality of sources, including an interactive advertising module, matching one or more dimensions of the query, may be identified. The content modules may be selected from a plurality of sources based on a weight associated with the content modules. The weight of each content module may be provided as metadata and may identify a ranking of the content module. A topic page may be generated using the content modules with the order of the content modules based on the corresponding weight of each of the content modules. The order of the content modules may indicate the relevancy to the search query for a particular geo location. The resulting topic page may therefore be automatically glued together to target the most logical or possible intent of a user.

By analyzing the query to identify the various dimensions associated with a search query, only relevant content modules (including interactive advertisements that may be likely to generate revenue from the user) that match one or more dimensions may be returned glued together in the topic page. The embodiments thus provide a tool for optimizing search results, thereby enriching the quality of the topic page and any advertisements returned to the search results webpage. Further, the embodiments may allow for customization of the topic page by actively tracking user interaction at each of the content modules in the topic page. The user interactions may be used to dynamically weigh the content modules, and the topic page may be reconfigured to reflect the current weight of the content modules. The embodiments may address ambiguity of some queries by identifying the appropriate dimensions of the search query and returning content modules that are related to the dimensions of the search query. Reconfiguring of the topic page and refining the search by using the weight of the content modules may enrich the quality of the search results while providing the most relevant content modules for the query and for a particular user located in a particular geo location.

Figure 1:
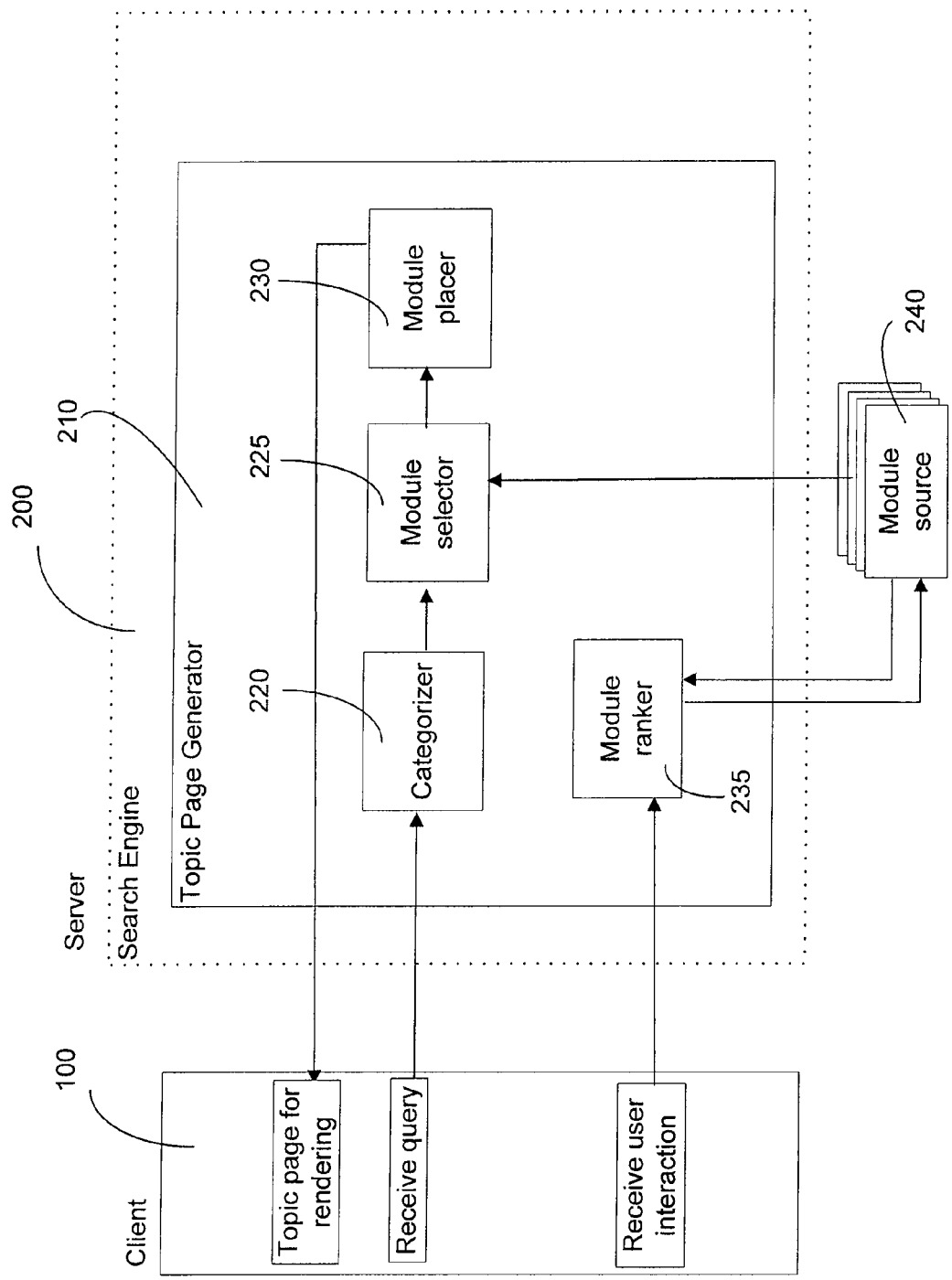
FIG. 1 illustrates a block diagram of an example system used in generating topic page for a plurality of dimensions, in accordance with embodiments of the present disclosure.

FIG. 1 illustrates a block diagram of various functional elements of an example computer system that may be used in generating a topic page for a search query on a search webpage, in accordance with embodiments of the present disclosure. Other forms may also be possible, so long as the processing logic can be carried out to generate the topic pages.

The system, as shown in FIG. 1, may include a client 100 with a user interface to receive and transmit a search query. The user interface may be communicatively coupled to a server 200 through a computer network, such as the Internet, for example. Client 100 and server 200 may be coupled wired and/or wirelessly and may use any technology that allows the user interface to interact with a search engine hosted on server 200. The user interface may also be used to render a topic page with one or more content modules that server 200 may return to the user interface in response to the search query, and to capture user interactions at one or more of the content modules rendered on a search webpage at the client 100.

Server 200 may include a search engine to receive a search query (query) from client 100, search one or more sources 240 available to the search engine through the network to identify and select a plurality of content modules matching the query, generate a topic page with the selected content modules, and return the topic page to the user interface at client 100 for rendering. The one or more sources 240 on the network may interact with the search engine to exchange information related to the query. The content modules identified and returned by the search engine may include one or more of textual information, audio content, video content, graphic images, or any other type of content that can be rendered on the search results webpage. In addition to various factual and informational contents, the content module may include sponsored advertisements from a plurality of sources that are relevant to the search query and the sponsored advertisements may, in turn, include audio, video, graphic, interactive elements, or any other form of content that can be rendered on the webpage.

Topic page generator 210 available to the search engine on server 200 may receive the query from the search engine and may interact with one or more sources 240 available to the search engine to identify and retrieve one or more content modules and generate a topic page using the content modules that match the query. Topic page generator 210 may be integrated within the search engine or may be distinct from the search engine, and may be available to the search engine for processing. Topic page generator 210 may include a plurality of modules, such as a categorizer module 220, a module selector 225, a module placer 230 and a module ranker 235.

Categorizer module 220 may receive the query and may analyze the query to identify a plurality of dimensions. Some of the dimensions identified by the categorizer module 220 may include a topic of interest, intents, and a geo location associated with the query. It should be noted that the geo location, as used in this application, encompasses three aspects of location—a website location, a user location and a query geo location. A website location may be the site used to initiate the query. For instance, when an Indian website (e.g. in.search.yahoo.com) is used for the query the website location may be India (or a specific location within India). For a Spanish-language website (e.g., telemundo.yahoo.com) used for the query, the website location may be Mexico or another Latin American country. A user location may a location from where a user of client 100 initiates the query, (e.g., where the user is based). For instance, for a user in Sunnyvale, Calif., U.S.A. using a Spanish-language website, the user location may be Sunnyvale, Calif., U.S.A. A query geo location is a location relevant to the subject matter of the query. For instance, a query, "Aishwarya Rai," (a popular Indian actress) may have a query geo location of India while a query "Matt Damon" (a popular American actor) may have a query geo location of U.S.A.

The geo location for the query may be determined based on any one, two, or all of these aspects of location, in any suitable manner. Categorizer module 220 may associate weights to the three aspects of location and determine the geo location based on such weights, using any suitable weighting and/or continuing algorithms. In one embodiment, categorizer module 220 may weigh the website location and the query geo location higher than the user location. In another embodiment, the query geo location is weighed higher than the website location and the user location.

In addition to determining the geo location, categorizer module 220 identifies a topic of interest for the query. The query may encompass a plurality of topics of interest. For instance, an ambiguous query, such as "Saturn," may be associated with both an automobile category and a science/astronomy category. The automobile category may be the preferred subject matter in one geo location while the science/astronomy category might be preferred in another geo location. In another instance, a query such as "Eagles" may result in a plurality of topic categories, such as entertainment-music (associated with the Eagles rock band), entertainment-sports (associated with the Philadelphia Eagles football team) and science (associated with the bird Eagle). The query, in this instance, may be for information on the football team, the bird, or the rock band group, depending on the geo location associated with the query. Thus, by identifying the geo location of the query, a relevant topic category may be identified and appropriate content modules selected for rendering on the search results webpage. Further, based on the popularity of the topic in the relevant geo location, appropriate content modules and other related content modules may be selected for rendering.

Categorizer module 220 further identifies one or more intents for the query. The intents define the purpose of the query for the topic at a particular geo location. For instance, the intent of the query "Saturn" in a geo location such as India may be associated with request for information about the planet, its moons, an astronomical event associated with the planet, etc. Example intents that may be identified include general information, breaking news, shopping, local happenings, specials, etc., for a topic at a specific geo location. By identifying the relevant intents of the query for a topic at a particular geo location, the search results may be refined to obtain relevant content modules that satisfy the query requirements, thus making the search results richer in quality and relevant in content.

Once the plurality of dimensions (topic(s) of interest, intent(s), geo location, etc.) are identified for the query, module selector 225 may use the dimensions to identify one or more content modules from a plurality of sources 240 available to topic page generator 210 for relevant topic and select the identified content modules for rendering on the search results webpage. The plurality of dimensions may be ranked based on the geo location. The dimensions may be ranked based on knowledge of the prior user interactions at the content modules associated with the corresponding dimensions. User logs, session logs and query logs may provide the information to rank the dimensions in each geo location. Module selector 225 may access the appropriate repository, such as a module gallery, at each of the plurality of sources 240 associated with the identified geo location to select the content modules relevant to the topic and intents of the query. The content modules may be stored in the module galleries based on the geo locations and topic. Each of the content modules may include metadata defining the contents within the content module.

In addition to information defining the contents within the content module, the metadata may include one or more rendering attributes that are used for rendering the content modules. The rendering attributes may include weights associated with the content modules that are used to rank and place the content modules in a topic page. The weight of a content module may include weights associated with each of the plurality of dimensions, and the ranking of the content module in a topic page may be based on the overall weight from all the dimensions. The content modules may be selected based on the highest overall weight of the content module. The sum of all the weights for each dimension of the query may equal to 1. For instance, because only one geo location is considered for a query, the overall weight for the geo location dimension may be 1. Similarly, when a plurality of topics are associated with a query, each of the topics may be weighted based on the popularity of that topic at the geo location, and the sum of all the weights for all the topics is equal to 1. A sample weight excerpt for each of the topics for the query "Saturn" in the geo location U.S. is shown in Table A below.

TABLE A

| | query = saturn |
|---|---|
| Topic 1. | business and finance |
| | Score = 0.699887034015313 |
| | Related Terms |
| | 2007 saturn view cars |
| | saturn |
| | www.saturn.com |
| | saturn.com |
| | saturn cars |
| | Directory Categories |
| | Automotive Makers > Vehicles |
| Topic 2. | technology and science/science |
| | Score = 0.289485795573407 |
| | Related Terms |
| | pictures of saturn the planet |
| | planet saturn |
| | rings of saturn |
| | saturn |
| | information about the planet saturn |
| | nine planets |
| | saturn's rings |
| | Directory Categories |
| | Planet Saturn |
| Topic 3. | technology and science |
| | Score = 0.0106271704112799 |
| | Related Terms |
| | nasa |
| | titan |
| | saturn |
| | cassini |
| | cassini huygens |
| | Directory Categories |
| | Cassini-Huygens: Mission to Saturn and Titan. |

The content modules from a plurality of dimensions may be combined to match the query. The weight of the content modules under each of the plurality of dimensions may be considered during the selection of the content modules.

Module placer 230 may obtain a list of content modules selected by module selector 225 and may generate a topic page including the selected content modules. Module placer 230 may use the rendering attributes in the metadata associated with each of the content modules to define the placement of the content modules in the topic page. Example metadata that may be used in placing the content module includes display size, preferred location, location where the content should not be placed, content type, author, source, weight and display flag. The weight of the content module may define the relevance of the content module with respect to a query and is used in ranking the content module. Module placer 230 may use the weight of each of the content modules and the rendering attributes to define the order and/or location in which the content modules are placed in the topic page. In placing modules, module placer 230 may attempt to keep modules ranked according to their respective weights as far as possible. The location of a sponsored module and/or an interactive advertising module may be fixed. The topic page defined by module placer 230 may be returned to the search results webpage at client 100 for rendering.

Topic page generator 210 may also include a module ranker 235 to define the weight of the content modules. The weight of the content modules describes the associated ranking of the content modules. Module ranker 235 may interact with the plurality of sources 240 to rank the content modules based on one or more weighting attributes. Some of the weighting attributes that may be considered in the weighting of the content module includes credibility of a source providing the contents for the content module, relevancy of a source with respect to one or more dimensions, quality of content within the content module, and frequency of updates to the content within the content module. Module ranker 235 may interact with the user interface at client 100 to obtain one or more user interactions. The user interactions may redefine one or more weighting attributes. For instance, a user interaction may result in the reconfiguration of the topic page due to rearranging of one or more content modules, and the reconfiguration may change the relevancy of the content modules thereby affecting the weight of the corresponding content modules. The affected weighing attributes may be used to dynamically adjust the weight of the corresponding content modules and to update the associated metadata. In another instance, a content module may be deleted from the topic page. In this instance, the content module weight may be adjusted and the display flag status may be updated to reflect the change. The updated weighting attributes of the affected content modules may be stored in the metadata and may be used by the module placer 230 during the placement of the content modules in the topic page returned to the search results webpage. The topic page may then be rendered on the search results webpage based on the updated weight. The rendered topic page may provide quality content modules, including interactive advertisements, with the most relevant contents for the topic of the query.

Figure 2:
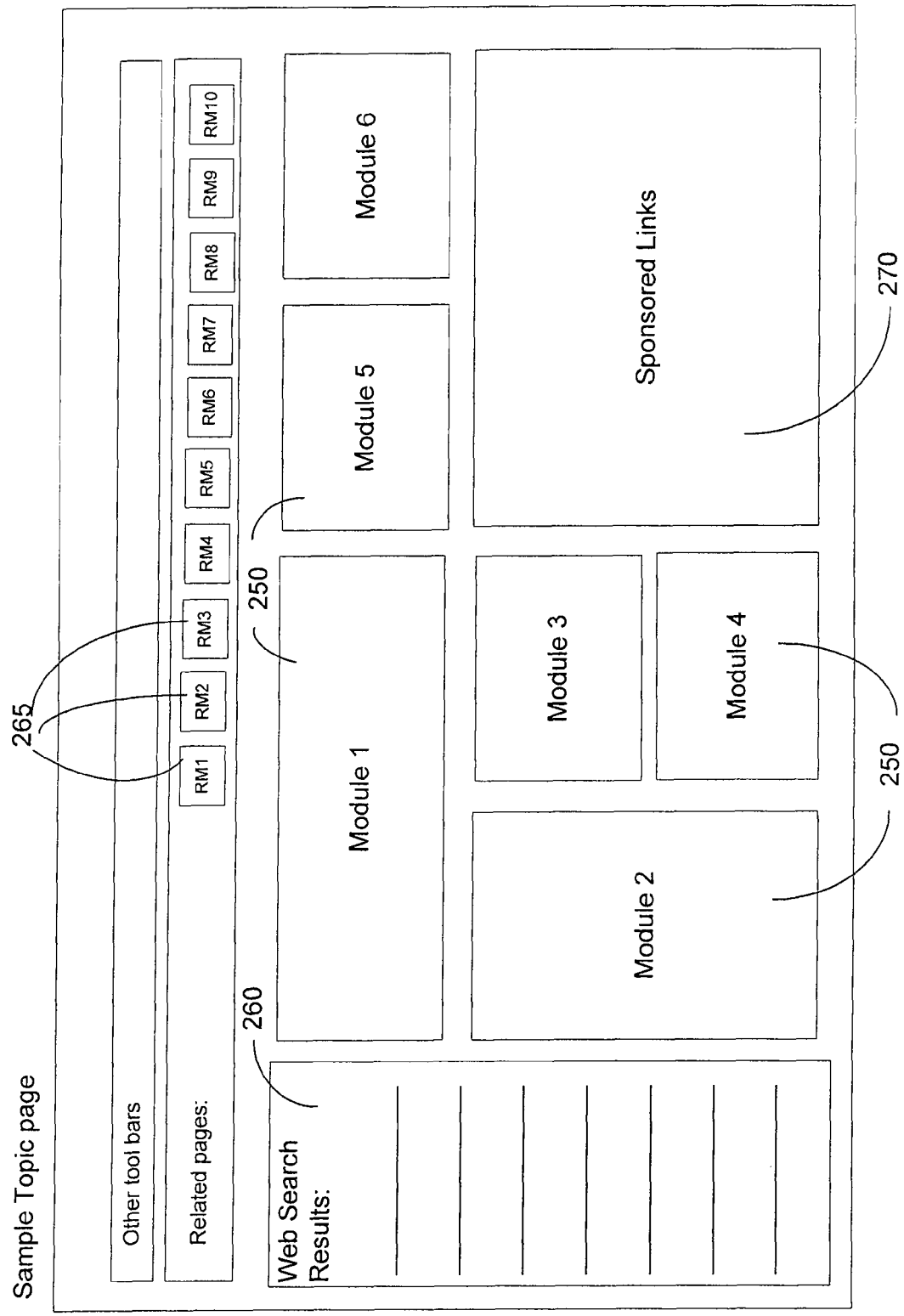
FIG. 2 illustrates a sample block view of an example search results page with a plurality of content modules and links to related pages, in accordance with embodiments of the present disclosure.

FIG. 2 illustrates a block representation of an example topic page that may be rendered on a search results webpage, in accordance with embodiments of the present disclosure. The topic page may include a plurality of content modules 250, modules 1-6, of varied sizes and contents that match a topic of the query but more than one intent for a geo location. A list of search results 260 for one or more topics associated with the query may be shown on the left side of the topic page. Additional topics may be suggested in a disambiguation navigation bar. A plurality of links to related pages 265, RM1-RM10, for the relevant topic may also be provided in the form of a navigation bar on the topic page. The topic page illustrated in FIG. 2 may be representative of a typical search results page with other navigation tool bars available for navigating through the content modules available on the topic page. One or more sponsored links 270 associated with the topic of the query may also provided.

Figure 2A:
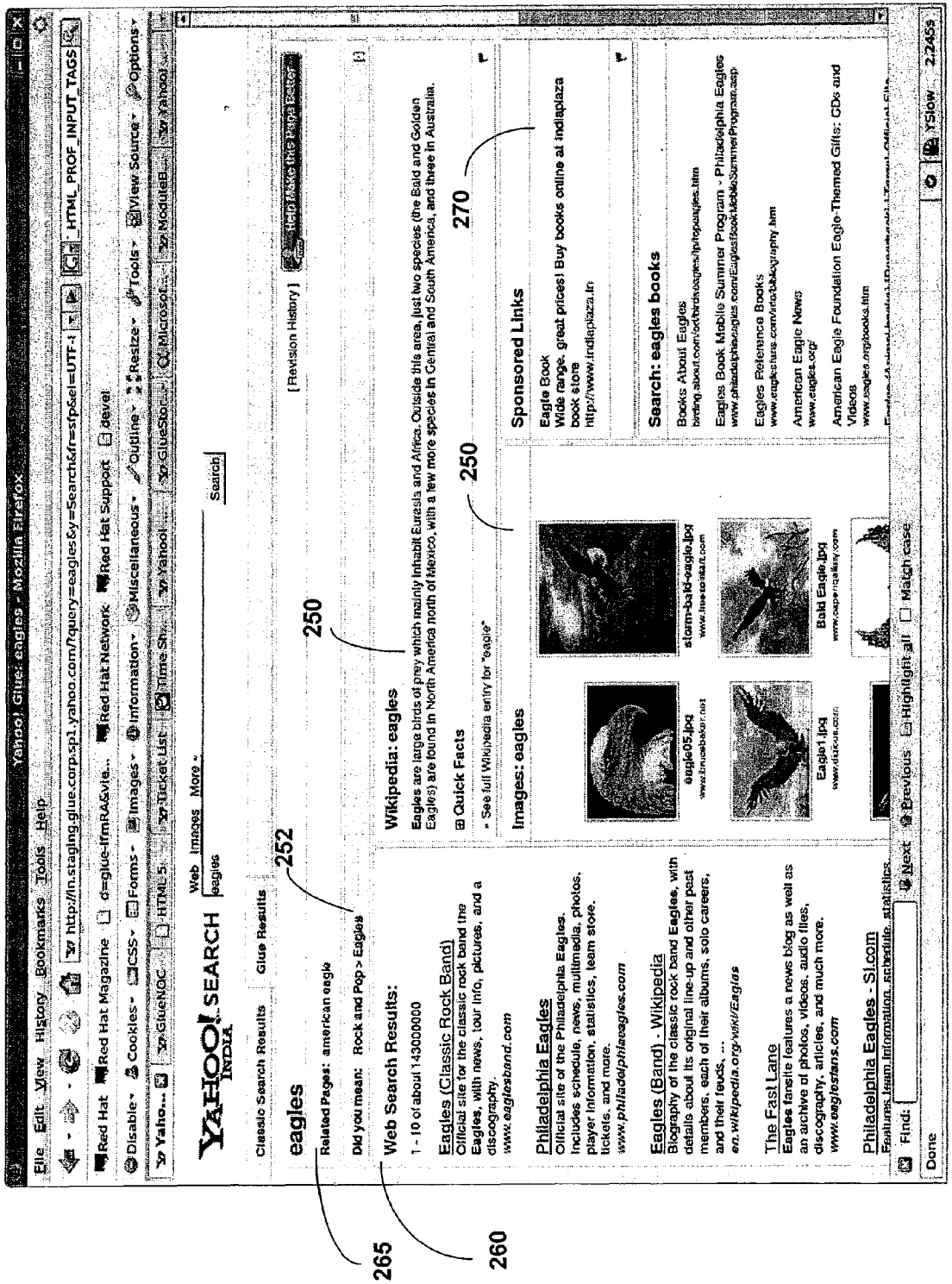
FIGS. 2A and 2B illustrate example topic pages with relevant content modules associated with a topic at different geo locations, in accordance with embodiments of the present disclosure.
Figure 2B:
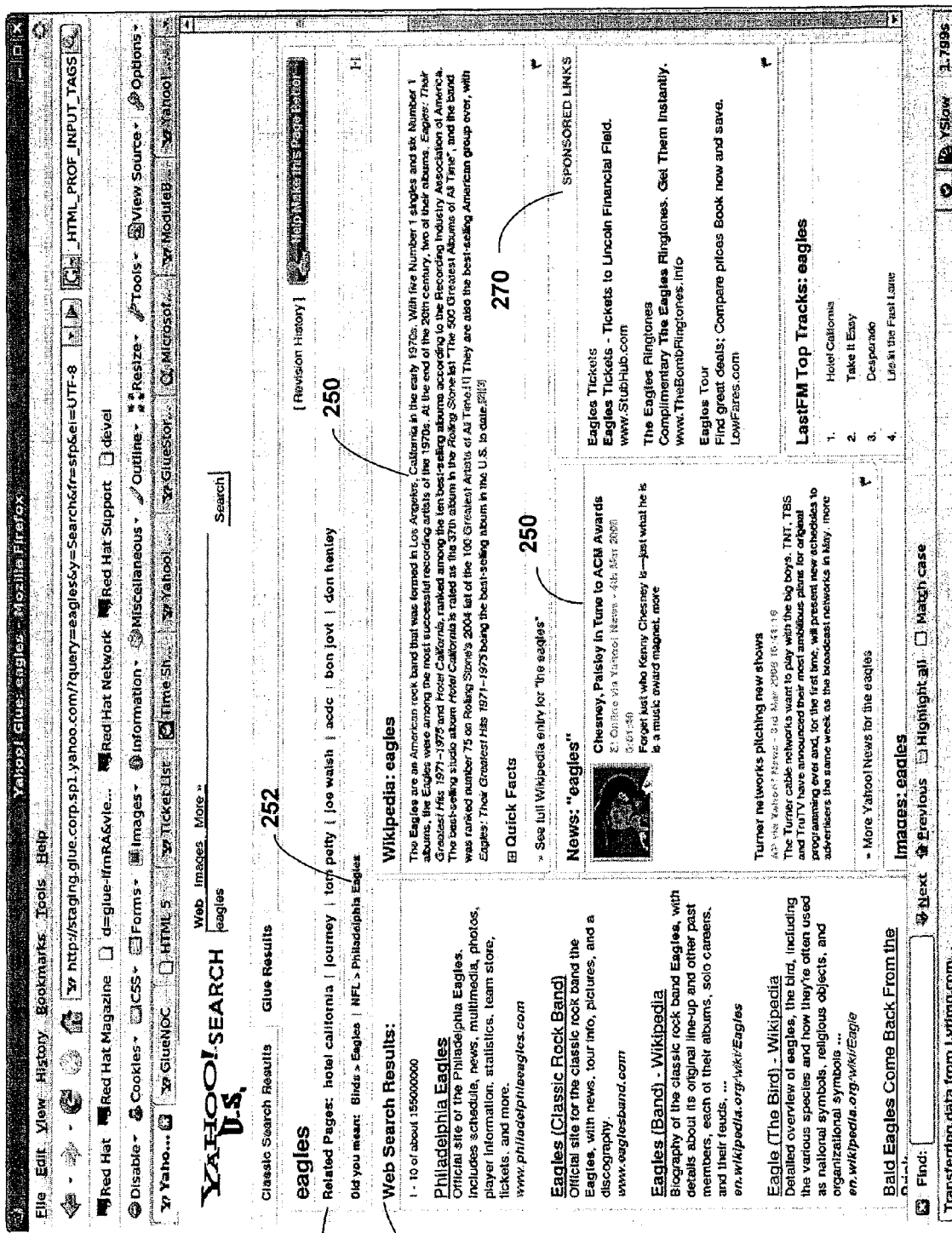

FIGS. 2A-2E each illustrate a snapshot of an example search results page, in accordance with embodiments of the present disclosure. FIGS. 2A and 2B each illustrate a topic page for a simple but ambiguous query, such as "Eagles," for different geo locations: India (FIG. 2A) and Philadelphia (FIG. 2B). As can be seen in FIG. 2A, the query may be analyzed to identify a plurality of dimensions associated with the query. The plurality of dimensions identified from the query may include a topic of science as being popular at the geo location India, and the appropriate content modules 250 may be returned in the topic page. Aside from the content modules, a list of search results 260 returned on the topic page may be associated with a plurality of topic dimensions identified for the query "Eagles," including the preferred topic, such as sports and entertainment-music, science-astronomy, etc. Along similar lines, a disambiguation navigation bar 252 in the topic page may identify alternate topic dimensions available for the query. Similarly, the links to related pages returned in response to the query may be associated with the topic that is most relevant for the geo location India associated with the query.

FIG. 2B illustrates a topic page for the query referenced in FIG. 2A for an alternate geo location, Philadelphia. In this embodiment, the same ambiguous query "Eagles" referenced in FIG. 2A may be analyzed to identify the plurality of dimensions associated with the geo location Philadelphia. The other dimensions associated with the query may be based on the geo location Philadelphia thereby resulting in a topic and/or intents that are popular in the identified geo location, which may be different from the topic and intents for the geo location India referenced in FIG. 2A. Content modules 250 returned may be related to the identified dimensions, based on the popularity of the dimensions at the geo location Philadelphia. Just like the search results, a disambiguation navigation bar 252 in the topic page may identify alternate topic dimensions available for the query. As illustrated in FIG. 2B, content modules 250 are identified and selected for the geo location Philadelphia, with the popular topic being identified as entertainment-sports.

Figure 2C:
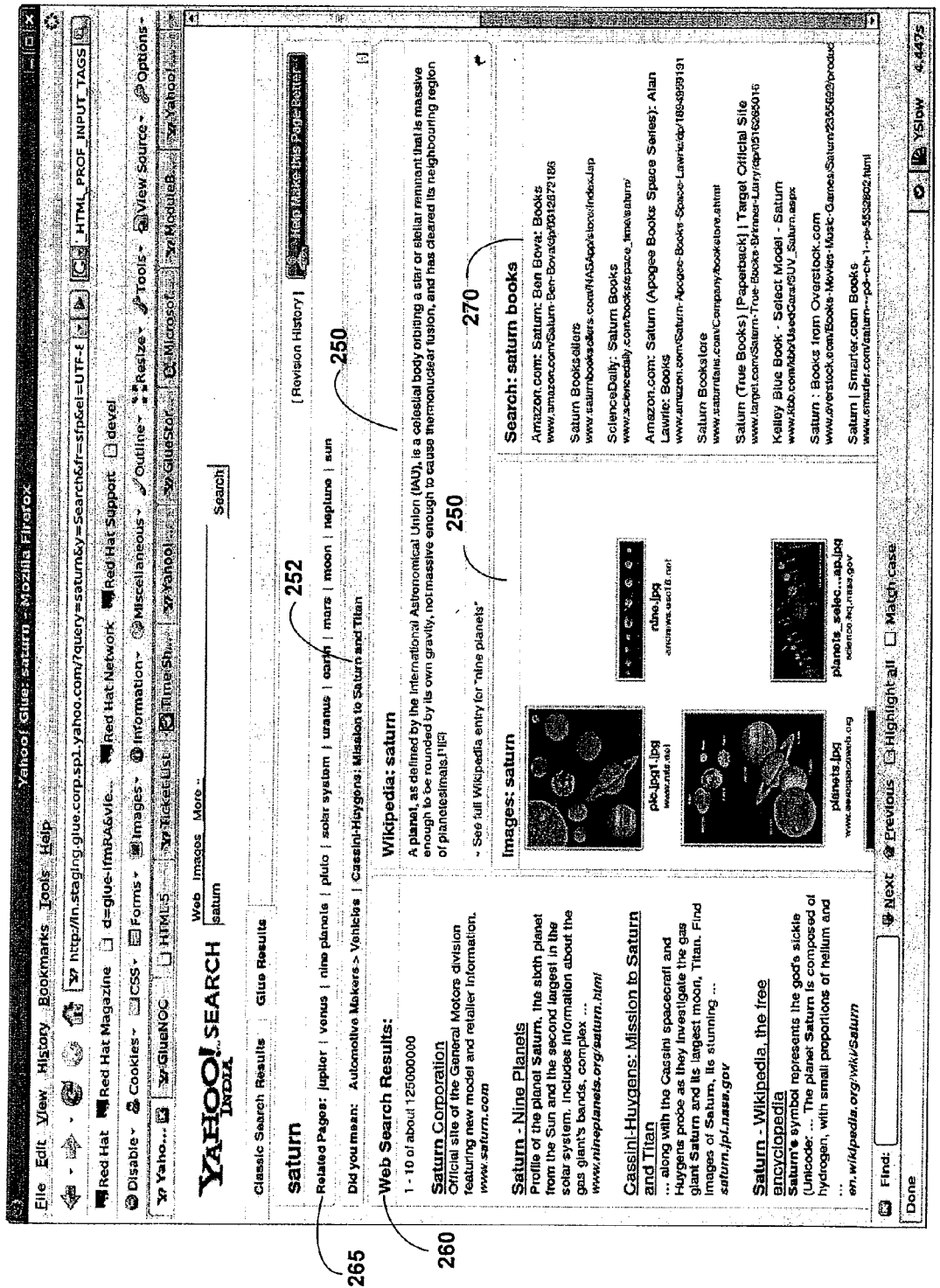
FIGS. 2C and 2D illustrate example topic pages with relevant content modules associated with another topic at different geo locations, in accordance with embodiments of the present disclosure.
Figure 2D:
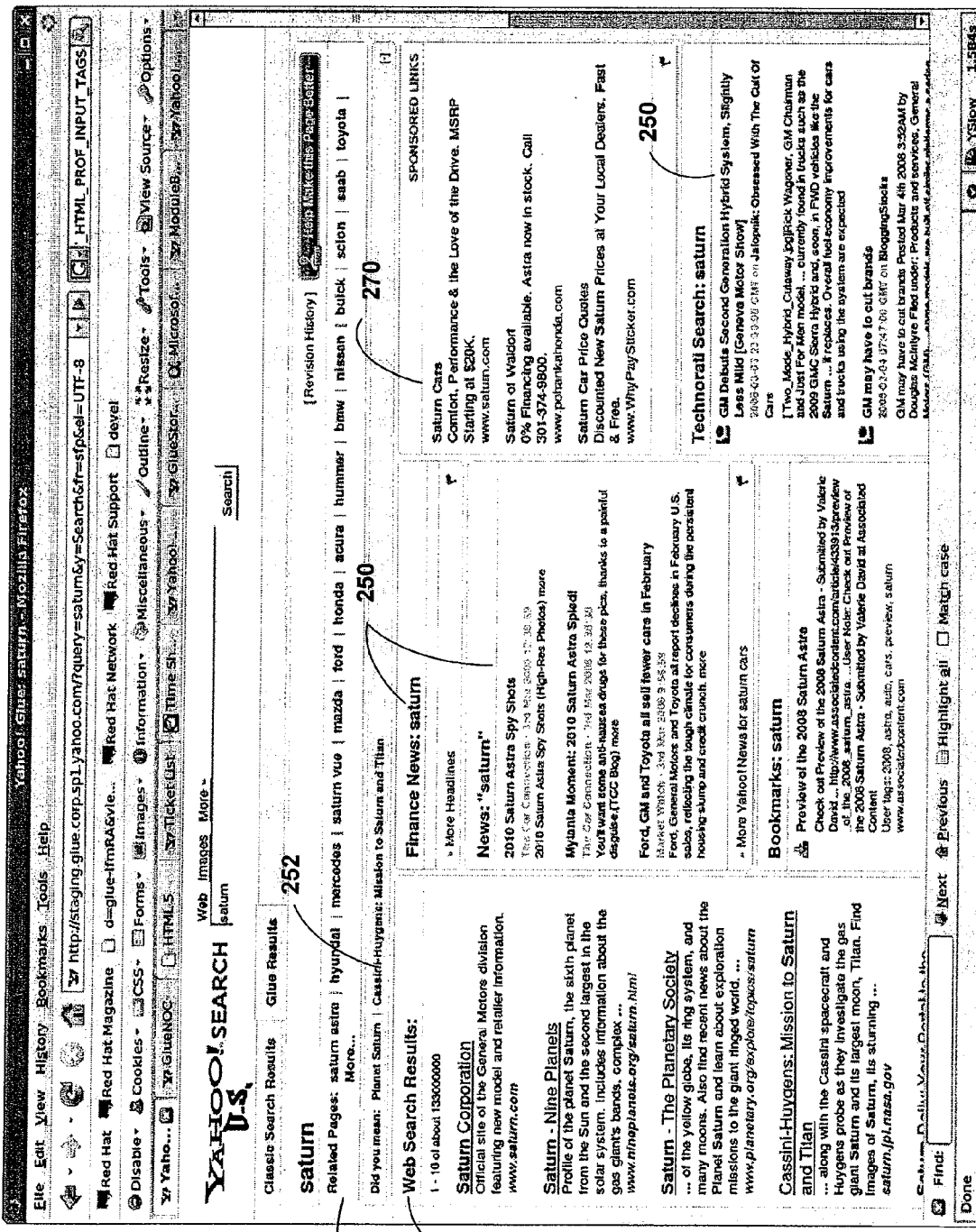

FIGS. 2C and 2D each illustrate a topic page for another ambiguous query that is distinct from the one illustrated in FIGS. 2A and 2B. As shown in FIG. 2C, a simple query "Saturn" may be received and analyzed at server 200 to identify the geo location as India and the most popular topic for the geo location as science/astronomy. It should be noted that when a query is analyzed, the analysis may identify one geo location for the query, one or more topics popular or commonly searched at the geo location, and one or more intents for each identified topic. For example, upon identifying the geo location, a topic associated with the query may be identified along with one or more intents to further refine the search to obtain the most relevant content modules 250 for the query. The geo location may be identified based on the subject matter of the query, and the topic and intents may be identified based on the subject matter at the geo location. The intents may be used in further refining the search. Content modules 250 may be stored at a plurality of sources in repositories, such as module galleries, and the corresponding metadata may be used for selecting the content modules that match the one or more dimensions. Thus, when a query such as "Saturn" is received, module selector 225 at the search engine may identify the most popular topic at the identified geo location, and may use the metadata of content modules 250 to identify the appropriate content modules 250 that match the topic and intents associated with the query for the geo location. If more than one topic is equally popular at the geo location, then the content modules for each of the topics may be identified and returned. A plurality of search results and a disambiguation navigation bar may identify alternate topic dimensions available for the query.

In addition to the content modules for an identified topic(s), additional topics may be identified and used in selecting one or more search results and sponsored results for the topic popular or commonly sought at the identified geo location. The sponsored results, such as advertisements, that are included in the topic page may be tailored for the identified geo location. As shown in FIG. 2C, the topic page returned to the search results webpage includes web search results box 260 for a topic popular or commonly sought at the identified geo location, sponsored search results box 270 tailored for the identified geo location, a disambiguation navigation bar 252 identifying alternate topics available for the query, and a plurality of content modules 250 for the identified topic. Content modules 250 may be presented in the topic page in an order defined by weights associated with content modules 250. The topic page may also include a plurality of links to related pages for the specific topic, as shown in the navigation bar 265. The topic page illustrated in FIG. 2C is shown for the geo location, India.

FIG. 2D illustrates a topic page for the same query, "Saturn," received at an alternate geo location California, United States. As can be seen, the most popular search topic for the geo location of California for the query "Saturn" may be automobile, and content modules 250, search results, links to related pages, and sponsored advertisements may be selected accordingly. Thus, based on specific geo locations, the relevant topic and intents are identified and the search is refined to identify appropriate content modules 250 based on the intents for the relevant topic within the geo location, such that the returned content is richer in quality and more relevant to the query at the relevant geo location, as can be evidenced by the returned search results shown in FIG. 2D.

Figure 2E:
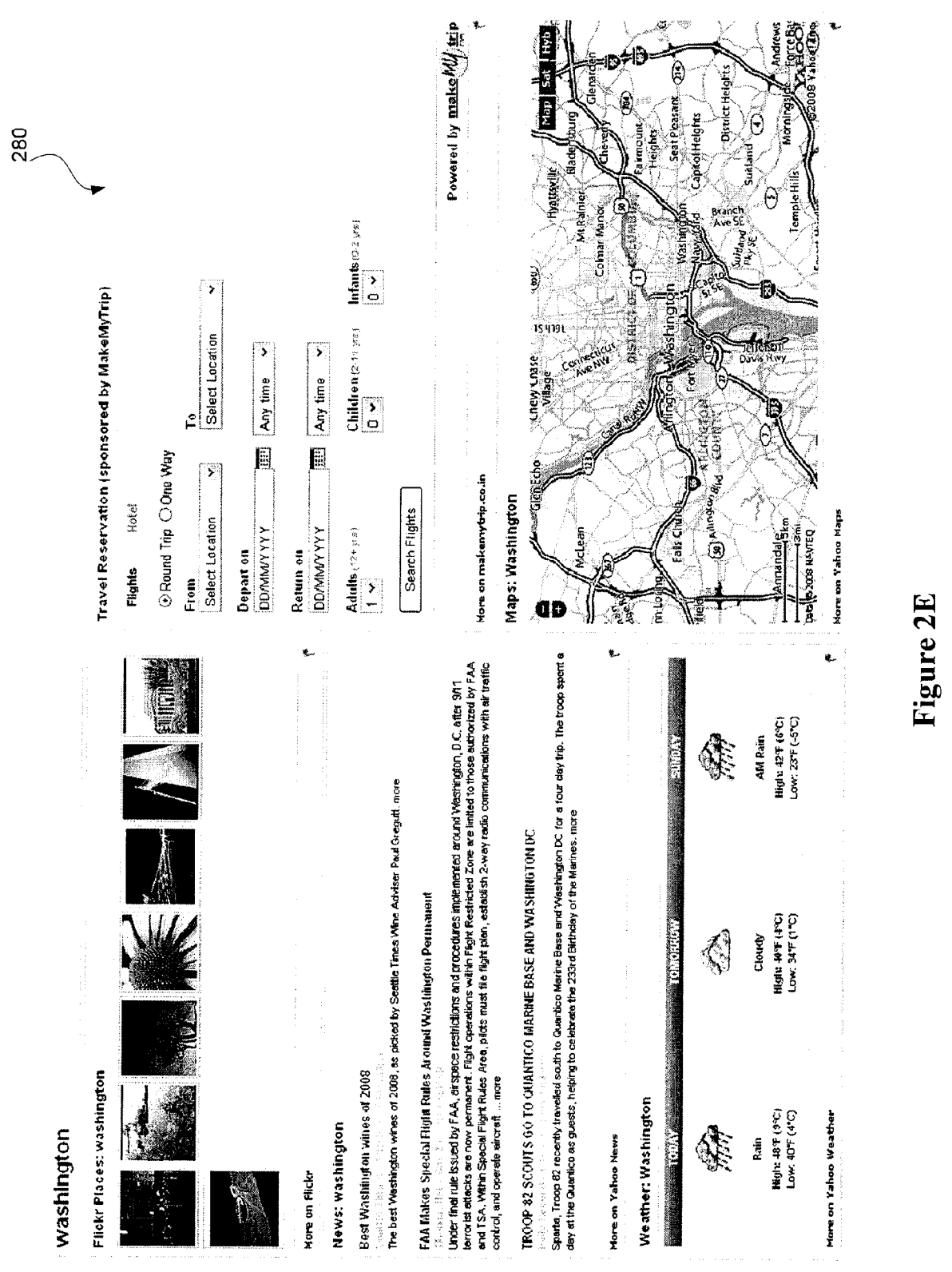

FIG. 2E illustrates a topic page for another ambiguous query that is distinct from the ones illustrated in FIGS. 2A-2D. As shown in FIG. 2E, a simple query "Washington" is received and analyzed at the server to identify the geo location as Boston, Mass. and the most popular topic for the geo location as the city of Washington, D.C. As shown in FIG. 2E, relevant advertisements may be identified and used in selecting one or more interactive advertising modules 280 that are included in the topic page and tailored for the geo location Boston based on one or more dimensions (e.g., geo location, topic, intents, etc.). For example, as depicted in FIG. 2E, interactive advertising module 280 may include interactive advertising that may allow a user to interact with interactive advertising module 280 to reserve a flight and/or hotel to Washington, D.C. (e.g., a module with fields allowing a user to reserve an airline fare by selecting a departure location, destination location, travel dates, number of travelers, etc.). In addition, based on the query and geo location Boston, certain portions of the interactive advertising module 280 may be displayed pre-populated with data. For example, the "From" field in the interactive advertisement depicted in FIG. 2E may be pre-populated with the geo location (e.g., "Boston") and the "To" field may be pre-populated with a destination based on the query and/or geo location (e.g., "Washington, D.C."). In different geo locations, the fields may be pre-populated with different data. For example, if the same query of "Washington" is entered in a geo location of Los Angeles, Calif., the "To" field may be pre-populated with a destination in Washington State (e.g., "Seattle, Wash.").

Although FIG. 2E depicts an interactive advertising module 280 that presents an interactive advertisement allowing a user to make travel reservations based on a query associated with a geographical region, any suitable type of interactive advertisement may be presented as part of interactive advertising module 280. For example, in certain geo locations, a query of the search term "Eagles" may result in display of an interactive advertising module 280 that includes an interactive advertisement allowing a user to purchase tickets to a concert by the Eagles rock band (e.g., interactive fields for entering number of tickets, preferred seating location, etc.) and/or licensed merchandise related to the Eagles rock band (e.g., interactive fields for entering a shirt size, desired color, etc., for a licensed t-shirt). In other geo locations, a query of the search term "Eagles" may result in display of an interactive advertising module 280 that includes an interactive advertisement allowing a user to purchase tickets to a Philadelphia Eagles football game (e.g., interactive fields for entering number of tickets, preferred seating location, etc.) and/or licensed merchandise related to the Philadelphia Eagles football team (e.g., interactive fields for entering a shirt size, desired color, etc., for a licensed t-shirt). As another example, a search term "iPod" in one or more geo locations may result in an interactive advertising module 280 that includes an interactive advertisement allowing a user to customize and/or purchase an iPod (e.g., interactive fields for entering a desired color, storage capacity, etc.).

Figure 3:
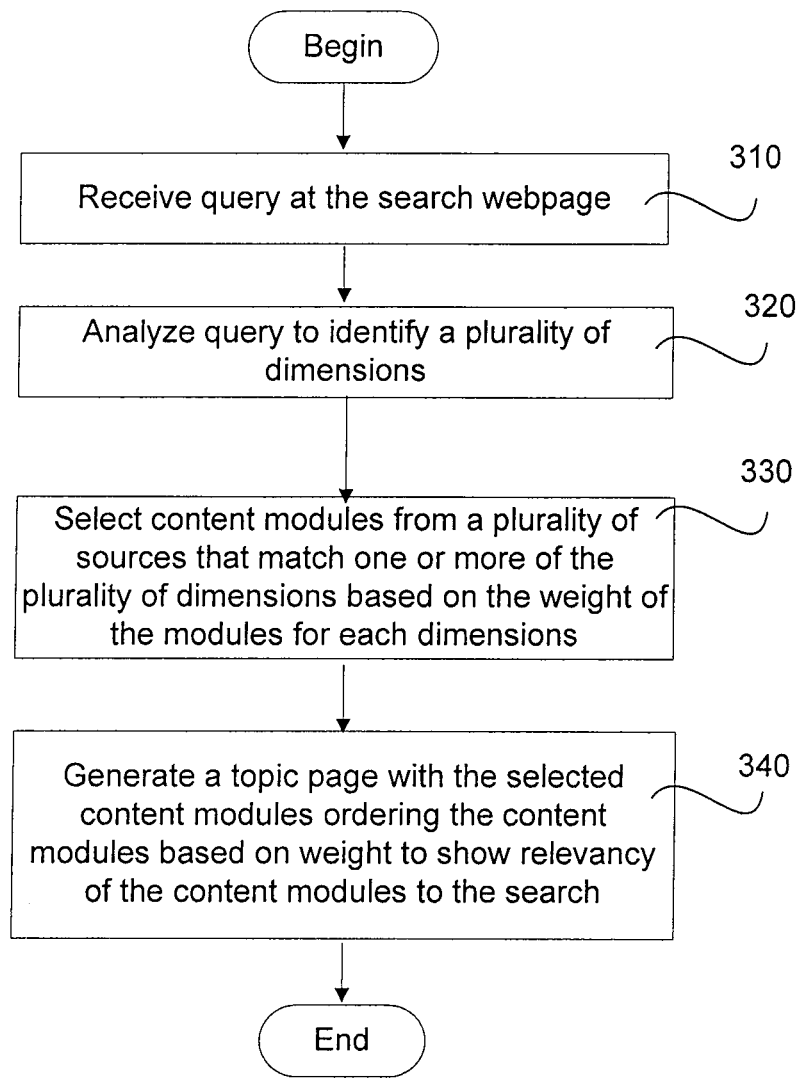
FIG. 3 illustrates a flow chart of an example method for generating a topic page for a search query, in accordance with embodiments of the present disclosure.

FIG. 3 illustrates and example method for the generation of the topic page, in accordance with embodiments of the present disclosure. The method may begin when a search query is received at a search webpage, as illustrated in operation 310. The query may be received through a user interface at a client 100 and may be transmitted to a search engine on server 200 for further processing. A search engine on server 200 may receive the query and may forward the same to topic page generator 210. Categorizer module 220 within topic page generator 210 may analyze the query and may identify a plurality of dimensions associated with the query, as illustrated in operation 320. Categorizer module 220 may receive the query and may analyze the query to first identify a geo location associated with the query. The geo location may or may not be the location from where the query originated. After identifying the geo location, a topic for the query and one or more intents for the topic of the query may be identified.

A plurality of content modules 250 from various sources that match one or more dimensions may be identified and selected, as illustrated in operation 330. In certain embodiments, the selected content modules 250 may include one or more interactive advertising modules 280. Content modules 250 may be selected based on an identified topic and/or associated intents. The topic of a content module 250 may be determined using an algorithm within module selector 225, the logic of which is described herein. When a website is generated for a particular product, service or event, the website or a webpage within a website may be assigned a space ID to identify the website. For instance, Wikipedia™ may be assigned a space ID and topic pages within the Wikipedia™ website, such as "Britney Spears" or "cricket," may each have a space ID different from the space ID for Wikipedia™. The space IDs may be associated with a webpage shown in search results and if available, they may be logged when a user clicks on a search result.

The space ID may be stored in a taxonomy directory that is available to module selector 225 within topic page generator 210 in the search engine during a search. The space ID may be stored as a node under a "category node." Each category node may also have a space ID. For example: 8650401 may be a space ID that may be clicked when people search for "cakes" and this space ID may be under category node "Society and Culture>Food and Drink>Cooking>Recipes." The parent of this node is "Society and Culture>Food and Drink>Cooking," which has a space ID of its own. The assignment of space ID to a topic in the taxonomy directory may be done manually, automatically or semi-automatically. Each Space ID in the taxonomy directory for a website may be mapped to a topic category.

When a search query is received at the search engine and the dimensions are identified, the search engine may use the taxonomy directory to obtain the space ID of a content module 250 associated with the website based on a match of the topic from the query with the topic associated with the website. The topic associated with the query may be defined using the following algorithm.

All user clicks for a query at search results webpage may be collected. For each user click at a search result, it may be determined if there is a corresponding space ID logged for the URL of the search result. If there is no corresponding space ID associated, the clicked URL may be used to find out the space ID. For example, in one embodiment, for a query, such as "folic acid," a user may click on a URL, "www.nlm.nih.gov/medlineplus/folicacid.html". If this URL has an associated space ID, then this space ID may be used to determine the topic for the query. If not, a directory tree with this URL as a leaf may be used in determining the space ID for the query. The directory tree may then be traversed up to the next parent node and the process may be repeated until a URL with the space ID is located on this directory tree. For instance, in the above example, the parent node of this URL, www.nlm.nih.gov/medlineplus/, may be used to determine a topic for the query. A weight may be associated with each clicked URL. In one embodiment, the weight assigned to the clicked URL may depend upon how many sub paths were removed from the originally clicked URL to obtain the space ID. For instance, if the original node URL in the above example, www.nlm.nih.gov/medlineplus/folicacid.html, has an associated space ID, the weight assigned to this URL could be 1, as compared to the weight of the parent URL with space ID, www.nlm.nih.gov/medlineplus/, which might be assigned a weight of 0.5 and the URL, www.nlm.nih.gov/, could be assigned a weight of 0.33.

It should be noted that various clicked space IDs may belong to various category nodes in a taxonomy directory. For example, clicked space IDs for folic acid, in the above example, may belong to "Health>Nutrition>Nutrients>Vitamins>Vitamin B9 (Folic Acid)", "Health>Reference>Medline", "Reference>Encyclopedias", etc. Each of these category nodes in the taxonomy directory may be mapped to a module taxonomy using a mapping file. The mapping file may be generated automatically or manually. In the above example of folic acid, "Health>Nutrition>Nutrients>Vitamins>Vitamin B9 (Folic Acid)" may map to "/lifestyle/health", "Health>Reference>Medline" may map to "/technology and science/health", and "Reference>Encyclopedias" may map to "/information and reference". Each category in module taxonomy may receive a score based on total weight of clicked space IDs that map to the category. In the above example, more than one space ID may be mapped to the category, "Health>Reference>Medline" and "Health>Diseases and Conditions>Birth Defects" and both these categories get mapped to module taxonomy category "/technology and science/health". The module taxonomy with the highest score gets selected as topic category for the query, which in the above example may be "/technology and science/health".

Referring back to FIG. 3, the selected content modules 250 (including any interactive advertising modules 280) associated with the identified topic for the geo location may be ranked based on weights associated with the content modules 250. A topic page may be generated with the selected content modules 250. The order of content modules 250 in the topic page may depend on the associated weight. The process may concludes with the generated topic page being presented to client 100 for rendering, as illustrated in operation 340. The rendered topic page may provide content modules 250 that are rich in quality and contents that are most relevant to the query for a geo location. In certain embodiments, the content modules 250 may include one of more interactive advertising modules 280. Even ambiguous queries result in content modules 250 that are relevant to the search query with contents closely matching the most likely intents of the query thereby making the search more efficient and results more relevant. Although content modules 250 presented in the topic page may reflect the most likely intents of the query, pointers to other possible intents are provided through an ambiguous query navigation tool.

Figure 4:
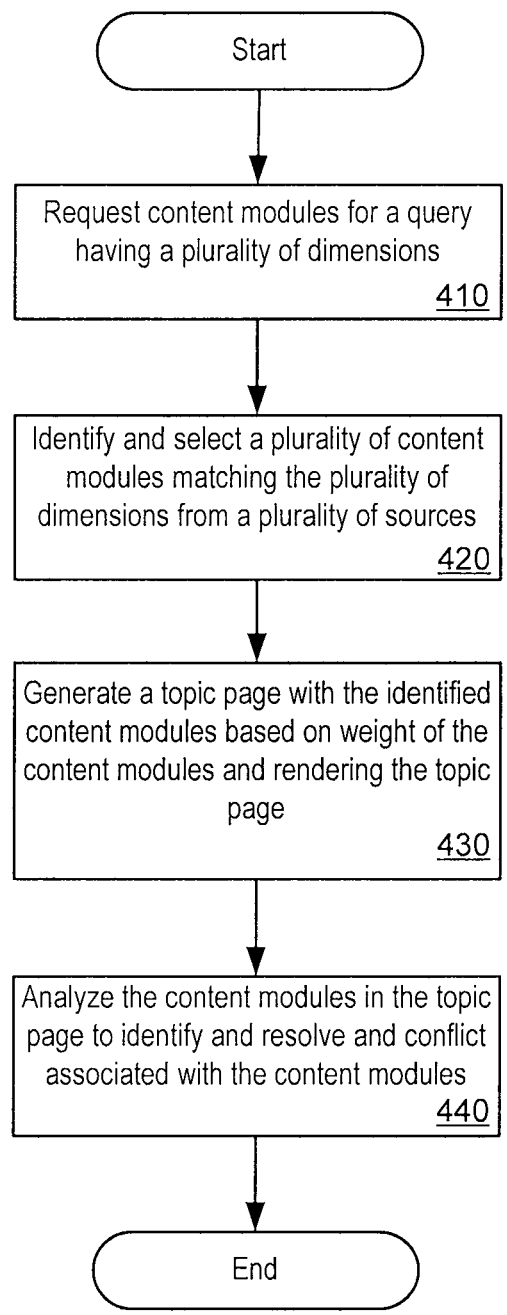
FIG. 4 illustrates a flow chart of an example method for generating a topic page for a search query, in accordance with embodiments of the present disclosure.

FIG. 4 illustrates an example method generating a topic page for a query on a search results webpage, in accordance with embodiments of the present disclosure. The method may begin at operation 410 wherein a search query request for content modules may be received at a search engine on server 200. The search query request may be obtained through a user interface at client 100 and forwarded to server 200. A search engine on server 200 may receive the query and may use a topic page generator 210 to analyze the query and identify a plurality of dimensions, such as a geo location associated with the query, a topic popular at the geo location and one or more intents for each of the topic. Topic page generator 210 at the search engine may search a plurality of sources available to the search engine to identify a plurality of content modules 250 (including one or more interactive advertising modules 280) that match one or more dimensions identified during the analysis of the query for the geo location associated with the query. In addition to content modules 250, a plurality of search results, links to related pages and sponsored advertisements may also be identified for the identified topic.

The identified content modules 250 may be selected from a plurality of sources, as illustrated in operation 420. The selected content modules 250 may be returned as a list that is ordered according to the associated weight. The weight may define the ranking order of the content modules 250 for the topic at the geo location for the query. The weight and, hence, the ranking of the content modules may be based on a set of weighting attributes associated with each of the content modules. Some of the weighting attributes that may be used for determining the weight of the content modules during the initial selection may include credibility of a source supplying the contents for the content module, relevancy of a source with respect to the topic, quality of content and the frequency of updates of the contents at the source for the respective topic. Upon selecting the relevant content modules, the weight of each of the content modules may be re-calculated using additional weighting attributes that define the popularity of the content modules with respect to the query. The additional weighting attributes considered for calculating the weight of the content modules may be obtained through statistical data. The statistical data may be obtained by tracking user interactions at each of the content modules which are captured in user logs, session logs and query logs. The statistical data from these logs may provide information on type of user interaction occurring at each content module, number of user interactions with a content module and number of times a content module gets included in a topic page. The type of user interactions that may be captured by the user, session and query logs may include addition of a new content module, deletion of a presented content module and re-arranging of the presented content modules. These user interactions may provide customization capability to content modules 250 on the topic page so that the resulting topic page is rich in quality and content. The re-calculated weight is updated in the metadata describing the contents of the content module 250 for future mining.

A topic page may be generated with the identified content modules, as illustrated in operation 430. The order of content modules 250 (including any interactive advertising modules 280) may be based on weight associated with the content modules and other metadata. Some of the metadata that may be used in ordering the content modules may include display size, preferred location, location where the content module should not be placed, content type, author, source, weight, and display flag. Content modules 250 (including any interactive advertising modules 280) may be selected and placed on the topic page based on popularity, metadata and how well the content modules can be brought together to fit into the framework of the topic page.

Each topic page may include related pages. Each of the related pages may provide a link to another topic page with plurality of content modules or to a related website. The related pages may be ranked according to the corresponding weight. Session data may be used in order to determine the related pages. In order to determine the topic that is most relevant for a query at a particular geo location and to determine the related pages, an algorithm within module selector 225 may be used. The algorithm includes logic that is described herein. The algorithm may use session data of a plurality of users to determine a topic that is popular at a geo location. The session data for each session of a user may be analyzed to identify the plurality of queries performed in the session. Session data may be obtained from web search logs maintained at the search engine. Using the identified list of queries, a set of query pairs may be generated.

Each of the query pairs may be used across multiple user sessions for a particular geo location to determine the number of users that used one or more of the query pairs. The results may be aggregated across multiple users' respective user sessions to determine the number of times each of the query pairs appears in the user sessions and a scoring function is generated. A user session, as described in this application, is defined to start when a user starts a query and stops when a user logs off or is inactive for a pre-set period of time. In one embodiment, the pre-set period of time for inactivity may be set to 30 minutes. The queries within each query set may be determined to be somewhat related as the queries are done in a same user session and are done within a short period of time. Based on the data collected from pairs of queries, users' choice of topic may be determined and content modules, search results, and links to related pages may be determined for those topic which match the other dimensions of the query based on the geo location and topic. In addition to the algorithm described above, other algorithms and methods to calculate related pages, such as terms co-occurring in queries or in set of documents, may also be used.

The identified content modules 250, search results and links to related pages may be retrieved and a topic page may be generated using the identified content modules 250, search results and links to related pages, for rendering on the search results webpage. The generated topic page may be rendered at client 100 in response to the query. Upon rendering the topic page, content modules 250 may be analyzed to see if any of content modules 250 pose a conflict. Some of the content modules 250 returned in the topic page may be irrelevant to the query, rendered incorrectly or have unreliable content. For instance, a movie content module may be rendered on the topic page listing free movies and associated movie information. If a query is received for latest movie information, the movie content module may not have information for the latest movie to render on the topic page. In this instance, the contents of the movie content module are irrelevant to the query. The contents in the content module are dynamically updated periodically. As a result, the contents in a content module in a topic page for a query at a geo location that was relevant at one time may become irrelevant or obsolete at a later time due to the change in the content or due to change in priority or loss of interest in the content for the query at the geo location. In one embodiment, the user may be able to customize the topic page by removing the conflicted content module from the topic page. The conflicted content module may be replaced by some other content module that is relevant to the query or by reconfiguring the content modules in the topic page.

When a conflict is encountered at the topic page, the logic in the topic page generator may search all the sources to identify all content modules related to all the topics identified during the analysis of the query. An analysis of each of the identified content modules may be performed to determine which content module 250 has conflict and the type of conflict encountered. Some of the conflicts encountered may include failure of the content module to render when the topic page is rendered on the search results webpage, slow module downloads, heavy content module, poor content quality and heavy content of the topic page. A content module may fail to render for any number of reasons. One of the reasons may be the contents within the content module may be of poor quality or is content rich. Upon identifying the content module that failed to render, the logic in the topic page generator may be used to address and resolve the conflict, as illustrated in operation 440. Accordingly, the topic page generator logic may flag the display flag of the identified conflict content module so that the conflict content module's display is turned "off." This would ensure that the conflict content module is not rendered on the topic page.

In addition to flagging the display flag of the conflict content module, the topic page generator logic may search the plurality of sources to identify a secondary content module to replace the conflict content module. The original content module is called a primary content module, as the content module is relevant to the query. A secondary content module from either the same source as the primary module or from any other source is defined as a fallback content module (fallback module) as the secondary content module includes content that is relevant to the query but is weighted lower than the primary content module. A plurality of content modules may be defined as fallback modules for the primary content module. The fallback modules are normally not displayed in the topic page as the display flag of these modules are set to "off." A fallback module from the plurality of fallback modules may be identified and selected to replace the conflict content module based on the associated weight. Once a fallback module may be identified for the conflict content module, the display flag of the identified fallback module is flagged "on" so that the fallback module may be displayed on the topic page instead of the conflict content module. The weight of the fallback module may be considered during the generation of the topic page so that the order of the content modules reflects the relevancy of the content modules to the query.

In addition to a failure conflict, the speed of rendering of a content module may cause additional conflict at the topic page during rendering. As in the case of failure conflict, the conflict module with slow rendering speed may be identified and is replaced by a fallback module by flagging the display flag of the original content module "off" while flagging the display flag of the fallback module "on" so that the rendering of the topic page may be enabled, in one embodiment of the invention. In this embodiment, the replacement of the content module (primary with fallback) and the recalculation of the weights and corresponding updates to the metadata for the corresponding content modules may be done dynamically so that the content modules may be presented in the appropriate order in the topic page to reflect the relevancy of the content modules for the query at the geo location.

In one embodiment, the content module with slow rendering speed may be moved below a fold of the topic page so that the remaining relevant content modules may be rendered above the fold while the slow content module is still uploading below the fold. This might be due to the fact that the conflict content module may include rich content resulting in the slow rendering of the contents. In this embodiment, the fallback module may not be considered to replace the conflict content module due to the fact that the fallback module is of poor quality or has slow rendering speed, slower than the conflict content module or is non-existent. The moving of a content module 250 within the topic page necessitates rearrangement of content modules 250 and updates to weights and metadata of the content modules within the topic page so that the updated metadata correctly reflects the relevancy of the content modules for the query at the geo location.

Similarly, if the content of the content module is too content heavy, i.e., the module weight is too content heavy, the content module may be repositioned to the bottom of the topic page or below the fold so that the rendering of the remaining content modules is not adversely affected. Likewise, if the conflict is associated with poor quality of content, the contents of a primary content module may be switched with a fallback content module so that the relevancy of the contents and the quality of the topic page may be preserved. As mentioned above with reference to heavy content modules or failed content modules, the weight of the secondary content module may be considered to reconfigure the content modules within the topic page and the appropriate metadata updated so that future mining is enabled across all user sessions. Such customizing of the content modules may be enabled by the logic within the topic page generator so that only relevant content modules are rendered in the topic page in appropriate order enriching the quality of the contents rendered. The reconfigured topic page is available to all users at the geo location.

Lastly, during the conflict identification and resolution, the overall page content of the topic page may be evaluated to determine if the topic page is too content heavy. If the topic page is deemed too content heavy, one or more content modules with module content exceeding a pre-determined threshold are identified and replaced with appropriate fallback modules so that the conflict with the content heavy page may be appropriately addressed. In one embodiment, the pre-determined threshold for each content module may be set to be between about 150-200 KB. The replacement of the content modules with fallback modules is followed by appropriate adjustment to the corresponding weights and metadata so that the content modules are rendered on the topic page in the order of the weight reflecting the relevancy of the content modules to the query. Thus, by analyzing the content modules in the topic page to identify any conflicts and resolving the conflicts dynamically, the topic page generator logic may allow generating a topic page that is most relevant to the query while allowing customization of the contents to ensure quality of the contents within the content modules of the topic page.

In one embodiment, a plurality of intents for the query may be obtained using an algorithm disclosed in a related U.S. patent application Ser. No. 11/642,135, filed on Dec. 20, 2006, and assigned to the assignee of the instant application, which is incorporated herein by reference in its entirety. The above algorithm to obtain the plurality of intents should be considered exemplary and not limiting in nature. Other algorithm or ways may be employed to obtain the plurality of intents for the query.

The embodiments of the invention have been described as a dynamic process wherein upon receiving a query, a plurality of dimensions associated with the query are determined, appropriate modules are selected, a topic page generated and rendered at the search webpage dynamically at query request time. In certain embodiments, the selected modules may include an interactive advertisement permitting a user to interact with an interactive advertisement to purchase a service or product related to a search query, or otherwise obtain more information regarding a product or service related to a search query.

The embodiments of the invention have been described as a dynamic process wherein upon receiving a query, a plurality of dimensions associated with the query are determined, appropriate modules are selected, a topic page generated and rendered at the search webpage dynamically at query request time. It should, however, be noted that the embodiments are not limited to the dynamic processing of the query.

In one embodiment, a batch process is used to implement rendering of a topic page in response to a query. Accordingly, the batch process involves identifying query terms, and pre-processing the query terms. During the batch processing, each query term may be processed to identify a plurality of dimensions, select a plurality of content modules, and generate a topic page. Additionally, during the batch processing, the content modules that make up the topic page may be saved. In one embodiment, the batch processing can be carried out daily, hourly, or at any other periodic interval. An advantage of batch processing is an improvement in rendering speed of the topic page. The query terms that are selected for batch processing can come from many sources. Examples can include query logs, user logs, session logs, etc. Thus, query terms that are most popular may be found or identified for batch processing. In one example, the batch processing can be carried out during the evening or night. The next day, as users input query terms, if the terms were preprocessed in a batch, the generation and rendering of the topic page will be much more instantaneous. In one embodiment, if the terms were not pre-processed, then the terms may be processed at the time of receiving the search query term from the user. The generated topic page identifies the content modules of the generated topic page and such identification is saved, so future search queries for the same term are expedited in rendering. In other embodiments, the batch processed topic pages and modules are saved together, for even faster rendering.

As noted, the batch process may be run periodically and the selected plurality of content modules for each query may be stored in a repository, such as a module gallery, for future data mining.

Figure 5:
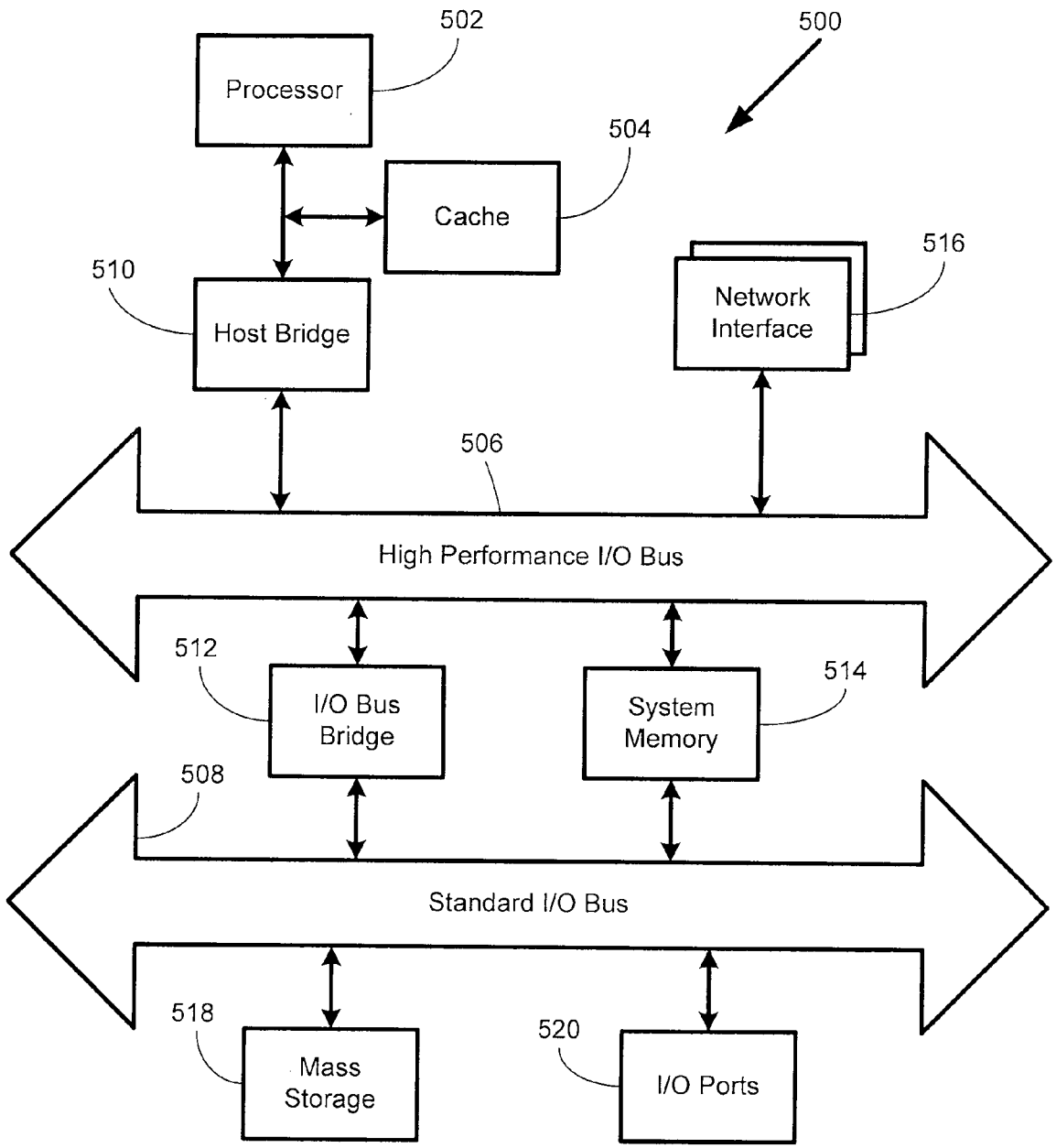
FIG. 5 illustrates an example computing system architecture that may be used to implement one or more physical servers depicted in FIG. 1.

FIG. 5 illustrates an example computing system architecture, which may be used to implement a physical server, e.g. server 200. In one embodiment, hardware system 500 comprises a processor 502, a cache memory 504, and one or more software applications and drivers directed to the functions described herein. Additionally, hardware system 500 includes a high performance input/output (I/O) bus 506 and a standard I/O bus 508. A host bridge 510 couples processor 502 to high performance I/O bus 506, whereas I/O bus bridge 512 couples the two buses 506 and 508 to each other. A system memory 514 and a network/communication interface 516 couple to bus 506. Hardware system 500 may further include video memory (not shown) and a display device coupled to the video memory. Mass storage 518, and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, etc. Mass storage 518 provides permanent storage for the data and programming instructions to perform the above described functions implemented in server 200, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments only a single bus may exist, with the components of hardware system 500 being coupled to the single bus. Furthermore, hardware system 500 may include additional components, such as additional processors, storage devices, or memories.

As discussed herein, in one implementation, the operations of one or more of the physical servers described herein are implemented as a series of software routines run by hardware system 500. These software routines comprise a plurality or series of instructions to be executed by a processor in a hardware system, such as processor 502. Initially, the series of instructions may be stored on a storage device, such as mass storage 518. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 516. The instructions are copied from the storage device, such as mass storage 518, into memory 514 and then accessed and executed by processor 502.

An operating system manages and controls the operation of hardware system 500, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Although the current embodiment has been described with respect to search queries, the processing of search queries should be considered exemplary and not limiting. Other types of queries may be processed using the teaching of the present invention.

Although the various embodiments of the invention have been defined with respect to topic page generator, the embodiments of the invention can be extended to serve other areas where content modules are rendered.

Thus, embodiments of the invention provide a tool to generate customized topic page that is rich in content and relevant to a query. The topic page is optimized for a geo location by analyzing the query to identify dimensions and including content modules for topic(s) that are most relevant at the geo location. Modules may also include one or more interactive ads permitting a user to interact with an interactive advertisement to purchase a service or product related to a search query, or otherwise obtain more information regarding a product or service related to a search query.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a topic page for a query, comprising:
    (a) analyzing a query to identify a plurality of dimensions of the query, the query being a search query and includes one or more keywords entered by a user to initiate a search, the one or more of the plurality of dimensions of the query identified based on at least one other dimension of the query;
    (b) selecting one or more content modules, including at least one interactive advertising module, from a plurality of sources that match one or more of the plurality of dimensions of the query;
    (c) generating a topic page from the selected content modules;
    (d) periodically processing as a batch, a plurality of query terms, through operations (a)-(c); and
    (e) saving identification of the selected content modules for the topic page,
    wherein generating the topic page further includes,
        determining if a particular one of the selected content modules poses a conflict within the topic page; and
        resolving the conflict posed by the particular content module so as to enable the topic page to be successfully rendered, in response to the query.

2. The method of claim 1, further comprising:
    pre-populating one or more portions of the at least one interactive advertising module based on at least one of the plurality of dimensions, wherein the plurality of dimensions includes a dimension associated with a user submitting the query.

3. The method of claim 1, further comprising:
    pre-populating one or more portions of the at least one interactive advertising module based on a topic associated with the query.

4. The method of claim 1, wherein resolving the conflict further includes,
   identifying a second content module to replace the particular content module posing the conflict in the topic page, the second content module received from any one of the plurality of sources including a source that provided the particular content module, the second content module matching the one or more of the plurality of dimensions of the query identified within the particular content module.

5. The method of claim 4, wherein resolving the conflict further includes,
   flagging the second content module so as to allow the second content module to render in the topic page.

6. The method of claim 1, wherein resolving the conflict further includes,
   flagging the particular content module posing the conflict in the topic page so as to prevent the particular content module from rendering on the topic page.

7. A method for generating a topic page for a search query on a search webpage, comprising:
   receiving a query at the search webpage;
   analyzing the query to identify a plurality of dimensions of the query, the query includes one or more keywords entered by a user to initiate a search, the one or more of the plurality of dimensions of the query identified based on at least one other dimension of the query;
   selecting one or more content modules, including at least one interactive advertising module, from a plurality of sources that match one or more of the plurality of dimensions, the selection of the content modules based on a weight associated with each of the plurality of dimensions used for selecting the content modules, the weight defining a ranking of the content modules, wherein the content modules selected from the plurality of sources include one or more secondary content modules, each of the secondary content modules having one or more dimensions that match the one or more of the plurality of dimensions defined in a specific content module selected for the query, the secondary content modules having a lower weight than the corresponding content modules;
   generating a topic page from the selected content modules, the content modules presented in an order based on the corresponding weight of the content modules, the order indicating relevancy of the content modules to the query, wherein generating of the topic page further includes,
   determining if a particular one of the content modules poses a conflict within the topic page; and
   resolving the conflict posed by the particular content module so as to enable the topic page to be successfully rendered, in response to the query.

8. The method of claim 7, further comprising:
   pre-populating one or more portions of the at least one interactive advertising module based on at least one of the plurality of dimensions, wherein the plurality of dimensions includes a dimension associated with a user submitting the query.

9. The method of claim 7, further comprising:
   pre-populating one or more portions of the at least one interactive advertising module based on a topic associated with the query.

10. The method of claim 7, wherein resolving the conflict further includes,
   selecting a particular secondary content module corresponding to the particular content module posing the conflict, the particular secondary content module used to replace the particular content module within the topic page, wherein the particular secondary content module is received from any one of the plurality of sources including the source that provided the particular content module.

11. The method of claim 7, further comprising:
   actively tracking statistical data at each of the content modules presented in the topic page, the statistical data identifying popularity of the corresponding content modules;
   dynamically determining a current weight of each of the content modules from a plurality of sources based on the statistical data, the current weight defining the current ranking of the content modules;
   selecting the content modules from the plurality of sources based on the current ranking; and
   presenting the content modules on the topic page, the selection and order of presentation of the content modules reflecting the adjusted ranking of the content modules in the topic page.

12. The method of claim 7, wherein analyzing the query by identifying a plurality of dimensions further including,
   determining a geo location associated with the query, the geo location driving the selection of the content modules;
   determining a topic of the query; and
   identifying one or more intents for the topic, the intent defined for the query based on the geo location.

13. The method of claim 12, the geo location based on at least one of: a location associated with the topic of the query and a dimension associated with a user submitting the query.

14. A system for generating a topic page for search queries on a search webpage, comprising:
   a client configured to generate a query and render the topic page;
   a server configured to receive the query from the client, the server including a topic page generator having:
      a categorizer module configured to analyze the query and identify a plurality of dimensions of the query, the query being a search query and includes one or more keywords entered by a user to initiate a search, the one or more of the plurality of dimensions of the query identified based on at least one other dimension of the query, wherein the plurality of dimensions includes a geo location associated with the query, a topic based on the geo location and one or more intents for the topic defined for the query based on the geo location;
      a module selector configured to select a plurality of content modules, including at least one interactive advertising module, from a plurality of sources that match one or more of the plurality of dimensions;
      a module placer configured to execute placement of the plurality of content modules into the topic page, the placement of the content modules defined by metadata associated with each of the content modules, wherein during the generation of the topic page the module placer is further configured to,
         determine if a particular one of the selected content modules poses a conflict within the topic page; and
         resolve the conflict posed by the particular one of the content modules so as to enable the topic page to be successfully rendered, in response to the query,
      wherein the server includes a processor.

15. The system of claim 14, further comprising at least one of the module selector and the module placer further configured to pre-populate one or more portions of the at least one interactive advertising module based on at least one of the plurality of dimensions wherein the plurality of dimensions includes a dimension associated with a user submitting the query.

16. The system of claim 14, further comprising at least one of the module selector and the module placer further configured to pre-populate one or more portions of the at least one interactive advertising module based on a topic associated with the query.

17. The system of claim 14, wherein the module placer is further configured to resolve the conflict by, identifying a second content module to replace the particular content module posing the conflict in the topic page, the second content module received from any one of the plurality of sources including a source that provided the particular content module, the second content module matching the one or more of the plurality of dimensions of the query identified within the particular content module, the second content module being flagged to enable rendering on the topic page.

18. The system of claim 14, wherein the topic page generator further includes a module ranker configured to actively track and receive user interactions from the topic page on the client, the user interaction including customization of the topic page, wherein the module ranker uses the user interaction to dynamically rank the content modules and update the rank of the content modules in the metadata of the content modules.

19. The system of claim 14, wherein content modules include dynamic content that are updated periodically at the corresponding source.

20. The system of claim 14, further including a module gallery at each of the plurality of sources for storing one or more content modules, the module gallery associated with a specific geo location.

* * * * *